(12) United States Patent
Lim et al.

(10) Patent No.: US 12,040,718 B2
(45) Date of Patent: Jul. 16, 2024

(54) POWER SUPPLY APPARATUS AND OPERATION METHOD THEREOF

(71) Applicant: Lite-On Singapore Pte Ltd, Singapore (SG)

(72) Inventors: Shu Fan Lim, Singapore (SG); Duy Hung Dam, Singapore (SG); Kiran Meravanagi Umesh, Singapore (SG)

(73) Assignee: Lite-On Singapore Pte Ltd, Singapore (SG)

( * ) Notice: Subject to any disclaimer, the term of this patent is extended or adjusted under 35 U.S.C. 154(b) by 240 days.

(21) Appl. No.: 17/829,371

(22) Filed: Jun. 1, 2022

(65) Prior Publication Data

US 2023/0396173 A1 Dec. 7, 2023

(51) Int. Cl.
*H02M 3/335* (2006.01)
*H02M 1/00* (2006.01)

(52) U.S. Cl.
CPC ..... *H02M 3/33569* (2013.01); *H02M 1/0009* (2021.05); *H02M 1/0029* (2021.05)

(58) Field of Classification Search
CPC ........... H02M 3/33569; H02M 1/0009; H02M 1/0029; H02M 1/0019; H02M 1/0025
See application file for complete search history.

(56) References Cited

U.S. PATENT DOCUMENTS

| 9,678,521 | B2 | 6/2017 | Liu et al. | |
|---|---|---|---|---|
| 10,205,394 | B2 * | 2/2019 | Pham | H03K 17/687 |
| 10,396,670 | B1 * | 8/2019 | Oh | H02M 1/08 |
| 2014/0016386 | A1 | 1/2014 | Weis et al. | |
| 2019/0157860 | A1 | 5/2019 | Duvnjak | |

FOREIGN PATENT DOCUMENTS

| TW | I649955 | 2/2019 |
|---|---|---|
| WO | 2020152340 | 7/2020 |
| WO | 2020158883 | 8/2020 |

OTHER PUBLICATIONS

"Office Action of Taiwan Counterpart Application", issued on Sep. 7, 2023, p. 1-p. 13.

* cited by examiner

*Primary Examiner* — Kyle J Moody
(74) *Attorney, Agent, or Firm* — JCIPRNET

(57) ABSTRACT

A power supply apparatus includes a plurality of switches, a current sensing circuit and a controller. The current sensing circuit is configured to sense an output current of the power supply apparatus. The controller includes a differentiator circuit that is coupled to the current sensing circuit and is configured to detect a rate of change of the output current. The controller further includes a pulse frequency modulation circuit that is configured to generate a plurality of first switching signals. The controller is configured to regulate a switching frequency of the plurality of first switching signals according to the rate of change of the output current in response to determining that the rate of change of the output current is greater than a rate threshold value and the switching frequency of the plurality of first switching signals is greater than a frequency threshold value.

18 Claims, 4 Drawing Sheets

POWER SUPPLY APPARATUS AND OPERATION METHOD THEREOF

TECHNICAL FIELD

The disclosure relates to power supplying, and more particularly to a power supply apparatus and an operation method thereof that are capable of quickly responding to a load change.

DESCRIPTION OF RELATED ART

A power supply apparatus is designed to supply power for many electronic devices such as electric vehicles, energy storage systems, mobile phones, computers and the like. A typical power supply apparatus includes a front-stage power factor corrector (PFC) and a second stage converter, in which a controller of the second stage converter is typically designed to operate in a frequency limitation under a no-load condition or a very light load condition. The controller may be saturated due to the frequency limitation, which leads to a slow response to the load change and results in a large output voltage drop. The large voltage drop may result in an unsatisfactory performance of the power supply apparatus. There is a need for a new design which improves the performance of the power supply apparatus.

SUMMARY

The disclosure introduces a power supply apparatus and an operation method thereof that are capable of quickly responding to a load change.

The power supply apparatus may include a transformer, a plurality of switches, a rectifier circuit, a current sensing circuit and a controller. The transformer includes a first side and a second side. The plurality of switching circuits is coupled to the first side of the transformer. The rectifier circuit is coupled to the second side of the transformer. The rectifier circuit outputs an output current. The current sensing circuit is coupled to the rectifier circuit. The current sensing circuit senses the output current. The controller is coupled to the current sensing circuit. The controller includes a differentiator circuit and a pulse frequency modulation circuit. The differentiator circuit is coupled to the current sensing circuit. The differentiator circuit is configured to detect a rate of change of the output current. The pulse frequency modulation circuit is coupled to the differentiator circuit. The pulse frequency modulation circuit is configured to generate a plurality of first switching signals. The controller is configured to regulate a switching frequency of the plurality of first switching signals according to the rate of change of the output current.

The operation method may be adapted to a power supply apparatus, wherein the power supply apparatus includes a transformer, a plurality of switches, a rectifier circuit, a current sensing circuit, and a controller. The transformer includes a first side and a second side. The plurality of switches is coupled to the first side of the transformer. The rectifier circuit is coupled to the second side of the transformer. The rectifier circuit outputs an output current. The current sensing circuit is coupled to the rectifier circuit. The current sensing circuit senses the output current. The controller includes a differentiator circuit and a pulse frequency modulation circuit. The differentiator circuit is coupled to the current sensing circuit. The operation method includes steps of detecting, by the differentiator circuit, a rate of change of the output current; generating, by the pulse frequency modulation circuit, a plurality of first switching signals; and regulating, by the controller, a switching frequency of the plurality of first switching signals according to the rate of change of the output current.

In some embodiments of the disclosure, a power supply apparatus includes a differentiator circuit that detects a rate of change of an output current in each sampling period. Thus, the load change or load jump can be detected quickly. The controller is configured to regulate the plurality of first switching signals based on a first regulating parameter in each sampling period, wherein the first regulating parameter is calculated according to the rate of change of the output current. In this way, the controller may quickly regulate the plurality of first switching signals from the moment that a load jump is applied. Thus, the power supply apparatus is quickly brought to the desired operating point without causing a deep drop of an output voltage. In addition, the gain buffer of the controller generates the first regulating parameter only under specific conditions (i.e., under a relatively large load jump from a no-load or very light load condition). In this way, an interference of the gain buffer to a normal operation of the controller under constant load regulation and small load jumps is prevented. Furthermore, in some embodiments, the differentiator circuit and the gain buffer may be implemented as firmware modules of the controller, or in an integrated circuit, without increasing manufacturing cost of the power supply apparatus.

DESCRIPTION OF THE EMBODIMENTS

Figure 1:
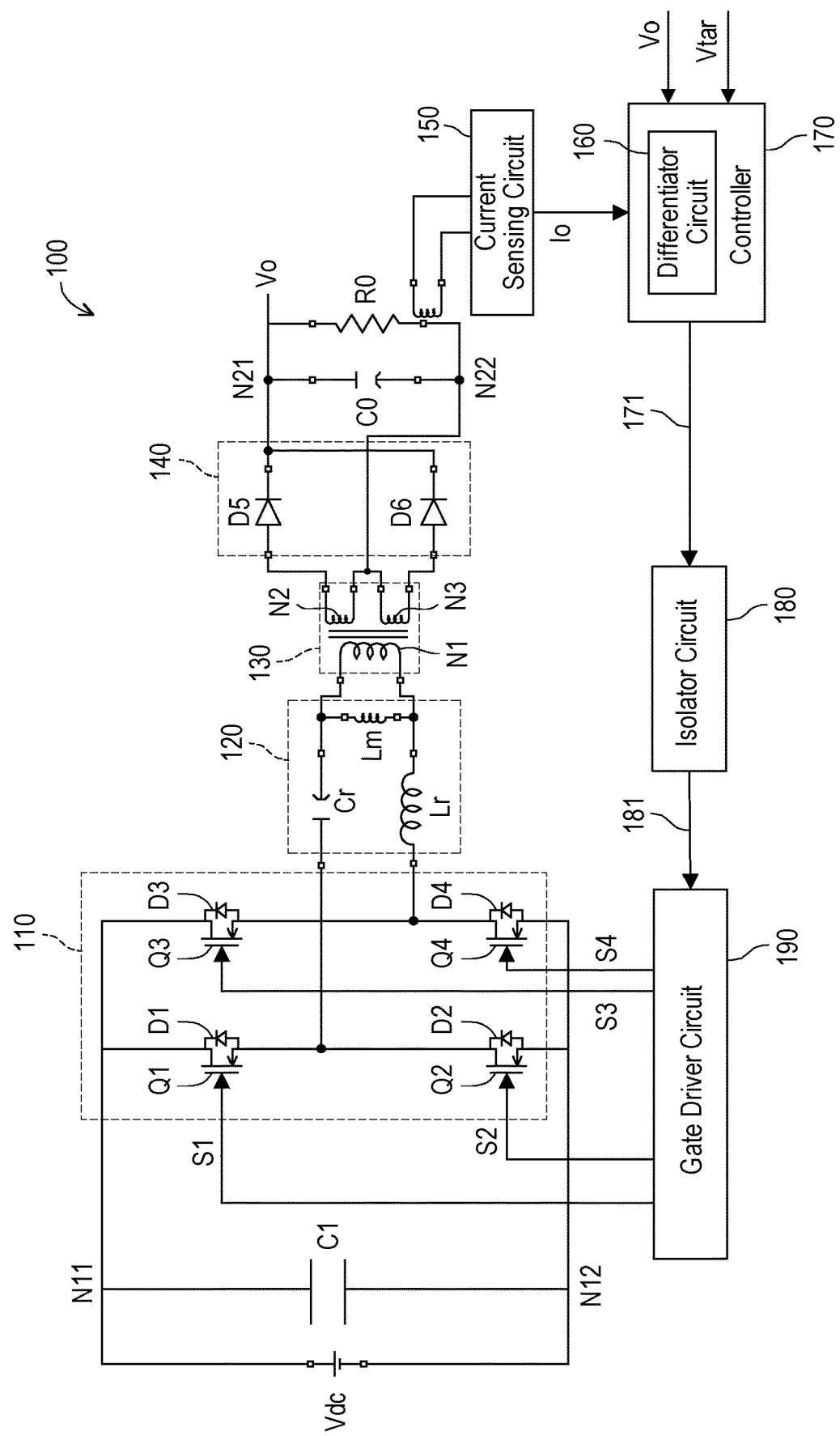
FIG. 1 is a schematic diagram of a power supply apparatus in accordance with some embodiments.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of a power supply apparatus 100 in accordance with some embodiments. The power supply apparatus 100 may include a switching circuit 110, a resonant circuit 120, a transformer 130, a rectifier circuit 140, a current sensing circuit 150, a differentiator circuit 160, a controller 170, an isolator circuit 180 and a gate driver circuit 190. The transformer 130 may include windings N1, N2 and N3. The winding N1 is coupled to a first side of the transformer 130. The windings N2 and N3 are coupled to a second side of the transformer 130. In some embodiments, the first side is referred to as a primary side of the transformer 130, and the second side is referred to as a secondary side of the transformer 130. The transformer 130 is configured to transfer electric energy between the first side and the second side through the windings N1, N2 and N3. It is appreciated that the transformer 130 may include more or less windings than the windings N1, N2 and N3 shown in FIG. 1.

In some embodiments, the switching circuit 110 includes a plurality of switches that are coupled to the first side of the transformer 130. The switching circuit 110 may include a first switch Q1, a second switch Q2, a third switch Q3 and a fourth switch Q4. In some embodiments, a first terminal of the first switch Q1 is coupled to a first terminal of the third switch Q3. A second terminal of the first switch Q1 is coupled to a first terminal of the second switch Q2. A second terminal of the third switch Q3 is coupled to a first terminal of the fourth switch Q4. A second terminal of the second switch Q2 is coupled to a second terminal of the fourth switch Q4. The first terminal of the first switch Q1 and the first terminal of the third switch Q3 may be coupled to a connection node N11. The second terminal of the second switch Q2 and the second terminal of the fourth switch Q4 may be coupled to a connection node N12.

In some embodiments, the plurality of switches is driven by a plurality of driving signals. The first switch Q1, the second switch Q2, the third switch Q3 and the fourth switch Q4 are driven by a first driving signal S1, a second driving signal S2, a third driving signal S3 and a fourth driving signal S4, respectively. In some embodiments, the first driving signal S1, the second driving signal S2, the third driving signal S3 and the fourth driving signal S4 are provided by the gate driver circuit 190.

In some embodiments, a diode is coupled in parallel to each of the first switch Q1, the second switch Q2, the third switch Q3 and the fourth switch Q4. For example, the first switch Q1 is coupled in parallel to the diode D1. In other words, a first terminal of the first switch Q1 is coupled to a first terminal of the diode D1, and a second terminal of the first switch Q1 is coupled to a second terminal of the diode D1. The first switch Q1 may have a control terminal that receives the first driving signal S1 from the gate driver circuit 190. Similarly, the second switch Q2 is coupled in parallel to a diode D2. The third switch Q3 is coupled in parallel to a diode D3. The fourth switch Q4 is coupled in parallel to a diode D4. The first switch Q1, the second switch Q2, the third switch Q3 and the fourth switch Q4 may be transistors.

In some embodiments, the power supply apparatus 100 further includes a capacitor C1 and a voltage source Vdc. The capacitor C1 and the voltage source Vdc are coupled between the connection node N11 and the connection node N12. In other words, a first terminal of the voltage source Vdc and a first terminal of the capacitor C1 are coupled to the connection node N11. A second terminal of the voltage source Vdc and a second terminal of the capacitor C1 are coupled to the connection node N12. The voltage source Vdc is configured to supply an operating voltage to the switching circuit 110.

In some embodiments, the resonant circuit 120 is coupled to the plurality of switches Q1, Q2, Q3 and Q4 and the first side of the transformer 130. The resonant circuit 120 includes a capacitor Cr, a first inductor Lr, and a second inductor Lm. A first terminal of the second inductor Lm is coupled to the capacitor Cr. A second terminal of the second inductor Lm is coupled to the first inductor Lr. The second inductor Lm may be coupled in parallel to the winding N1 of the transformer 130. In other words, the first terminal of the second inductor Lm may be coupled to a first terminal of the winding N1, and the second terminal of the second inductor Lm may be coupled to a second terminal of the winding N1. It is noted that the resonant circuit 120 may include more or less elements than the elements illustrated in FIG. 1. The resonant circuit 120 is configured to circulate a current flowing through the first side of the transformer 130 according to the plurality of driving signals S1, S2, S3 and S4. The resonant circuit 120 is configured to circulate a current flowing through the first side of the transformer 130 according to the first driving signal S1, the second driving signal S2, the third driving signal S3 and the fourth driving signal S4. In this way, the electric energy is transferred between the first side of the transformer 130 and the second side of the transformer 130.

In some embodiments, the rectifier circuit 140 is coupled to the second side of the transformer 130. The rectifier circuit 140 may include a first diode D5 and a second diode D6. A first terminal of the first diode D5 may be coupled to a first terminal of the winding N2 of the transformer 130. A second terminal of the first diode D5 may be coupled to a connection node N21. A first terminal of the second diode D6 may be coupled to a second terminal of the winding N3 of the transformer 130. A second terminal of the second diode D6 may be coupled to the connection node N21. In some embodiments, a second terminal of the winding N2 is coupled to a first terminal of the winding N3 and is coupled to a connection node N22 of the power supply apparatus 100. The rectifier circuit 140 outputs a current that is flowing through the second side of the transformer 130. The rectifier circuit 140 outputs an output current Io. In some embodiments, the rectifier circuit 140 includes a fifth switch Q5 and a sixth switch Q6, which replace the fifth diode D5 and the sixth diode D6.

In some embodiments, the power supply apparatus 100 further includes a capacitor C0 and a resistor R0. The capacitor C0 and the resistor R0 are coupled between the connection node N21 and the connection node N22. A first terminal of the resistor R0 and a first terminal of the capacitor C0 may be coupled to the connection node N21. A second terminal of the resistor R0 and a second terminal of the capacitor C0 may be coupled to the connection node N22. The output current Io flows through the resistor R0.

In some embodiments, the current sensing circuit 150 is coupled to the rectifier circuit 140. The current sensing circuit 150 senses the output current Io. The current sensing circuit 150 provides the output current Io to the differentiator circuit 160. The disclosure does not intend to limit a circuit structure of the current sensing circuit 150, and any circuit that may sense a value of a current falls within the scope of the disclosure.

Figure 2A:
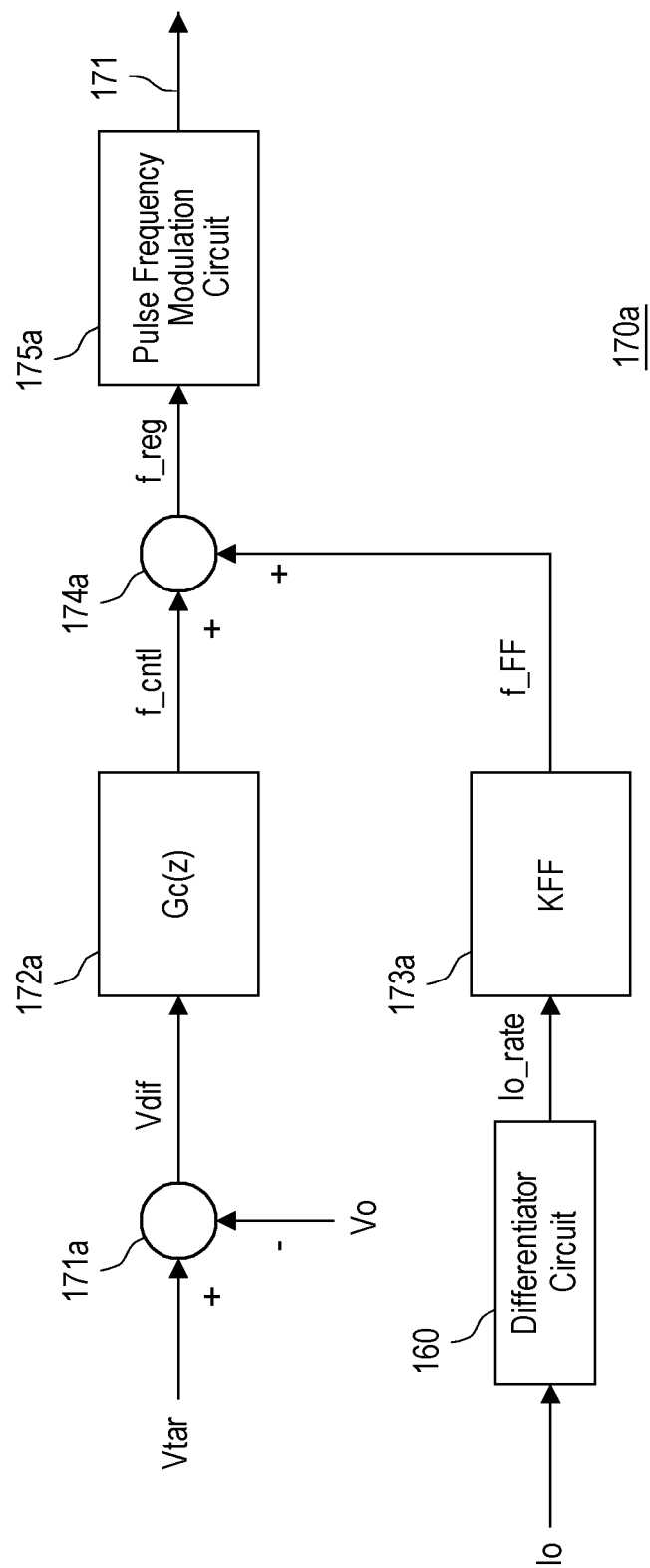
FIG. 2A and FIG. 2B are schematic diagrams of controllers of power supply apparatuses in accordance with some embodiments.
Figure 2B:
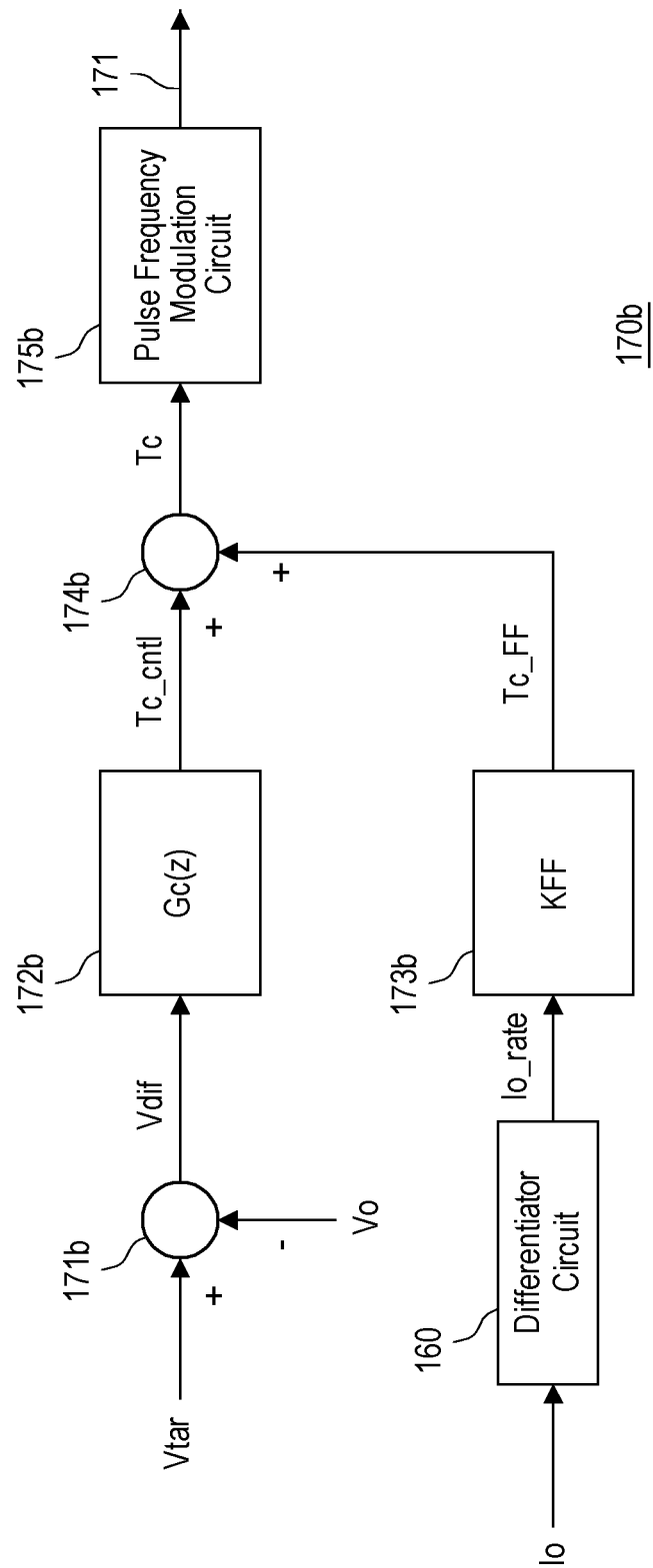

Referring to FIG. 1, FIG. 2A and FIG. 2B, in some embodiments, the controller 170 is coupled to the current sensing circuit 150. The controller 170 includes the differentiator circuit 160 and a pulse frequency modulation circuit. FIG. 2A shows the pulse frequency modulation circuit 175a. FIG. 2B shows the pulse frequency modulation circuit 175b. In some embodiments, the controller 170, the differentiator circuit 160 and the pulse frequency modulation circuit are implemented by a microcontroller, a circuit with digital logic, an integrated circuit, or a combination. In other embodiments, the controller 170 and the pulse frequency modulation circuit are implemented by a microcontroller, a circuit with digital logic, an integrated circuit, or a combination. The differentiator circuit 160 may be implemented with hardware. For example, the differentiator circuit 160 may be implemented with an operational amplifier, a capacitor, and a resistor.

In some embodiments, the differentiator circuit 160 is coupled to the current sensing circuit 150 and is configured to detect a rate of change Io_rate of the output current Io. In some embodiments, the differentiator circuit 160 is performed with hardware. An analog-to-digital converter (not shown) may convert the rate of change Io_rate of the output current Io to a digital value.

In some embodiments, the differentiator circuit 160 is implemented by a microcontroller, a circuit with digital logic, an integrated circuit, or a combination. The differentiator circuit 160 is configured to detect the rate of change Io_rate of the output current Io in each sampling period. The sampling period may refer to an execution period of the control logic of the differentiator circuit 160. In some embodiments, the differentiator circuit 160 is configured to detect the rate of change Io_rate of the output current Io according to equation (1), in which Io_rate(k) is the rate of change of the output current Io at a current sampling period, Io(k) is the output current at the current sampling period, and Io(k−1) is the output current at a previous sampling period, KD is the differentiator gain and Ts is a sampling period. The differentiator circuit 160 may detect the rate of change Io_rate(k) of the output current Io according to the differentiator gain KD and a difference between the output current in the current sampling period (i.e., Io(k)) and the output current in the previous sampling period (i.e., I(k−1)), wherein the current sampling period and the previous sampling period are consecutive sampling periods.

$$\text{Io\_rate}(k) = \frac{KD}{T_s} \cdot (Io(k) - Io(k-1)) \tag{1}$$

In some embodiments, the differentiator gain KD is determined according to a bit width of a register (not shown) in the controller 170. For example, the bit width of the register in the controller 170 may be 8 bits, 16 bits, 32 bits, 64 bits or any other suitable bit width. In some embodiments, the differentiator gain KD is determined such that a magnitude of the rate of change Io_rate of the output current Io at a maximum output current slew rate of the power supply apparatus 100 is less than a value of $2^{(n-1)}-1$, where n is the bit width of the register in the controller 170. For example, in a controller operating with 16-bit width registers, the magnitude of the rate of change Io_rate of the output current Io should be less than 32767. The maximum output current slew rate refers to a maximum slew rate of output current in a slew rate range. For example, the controller 170 may operate with the slew rate range 0.1 A/us to 1 A/us, in which the slew rate of 1 A/us is the maximum output current slew rate and 0.1 A/us is the minimum output current slew rate. It is appreciated that any other suitable slew rate range may be applicable for the controller 170.

In some embodiments, the controller 170 is configured to regulate a switching frequency of a plurality of first switching signals 171 according to the rate of change Io_rate of the output current Io. In response to determining that the rate of change Io_rate of the output current Io is greater than a rate threshold value and the switching frequency of the plurality of first switching signals 171 is greater than a frequency threshold value, the controller 170 is configured to regulate the switching frequency of the plurality of first switching signals 171 according to the rate of change Io_rate of the output current Io. In some embodiments, the waveforms of the plurality of first switching signals 171 are the same as the waveforms of the plurality of driving signals S1, S2, S3 and S4.

In some embodiments, the controller 170 may further receive an output voltage Vo and a target voltage Vtar. The controller 170 is configured to regulate the switching frequency of the plurality of first switching signals 171 according to the rate of change Io_rate of the output current Io, the output voltage Vo and the target voltage Vtar. The output voltage Vo is the voltage at the output terminal of the power supply apparatus 100, and the target voltage Vtar is a predetermined voltage.

In some embodiments, the isolator circuit 180 is coupled to the pulse frequency modulation circuit. The controller 170 is configured to output the plurality of first switching signals 171 to the isolator circuit 180. The isolator circuit 180 receives the plurality of first switching signals 171. The isolator circuit 180 outputs a plurality of second switching signals 181 to the gate driver circuit 190. The waveforms of the plurality of second switching signals 181 may be the same as the waveforms of the plurality of first switching signals 171. The isolator circuit 180 provides electrical isolation between the controller 160 and the gate driver circuit 190. The controller 160 is coupled to the second side of the transformer 130. The gate driver circuit 190 is coupled to the first side of the transformer 130.

In some embodiments, the gate driver circuit 190 is coupled to the isolator circuit 180. The gate driver circuit 190 receives the plurality of second switching signals 181. The gate driver circuit 190 outputs the plurality of driving signals S1, S2, S3 and S4 to the plurality of switches Q1, Q2, Q3 and Q4. The plurality of driving signals S1, S2, S3 and S4 drive the plurality of switches Q1, Q2, Q3 and Q4. The waveforms of the plurality of driving signals S1, S2, S3 and S4 may be the same as the waveforms of the plurality of second switching signals 181. The gate driver circuit 190 increases the power of the driving signals S1, S2, S3 and S4, which is necessary to drive the plurality of switches Q1, Q2, Q3 and Q4.

FIG. 2A illustrates a schematic diagram of a controller 170a of a power supply apparatus in accordance with some embodiments. Referring to FIG. 1 and FIG. 2A, the controller 170a in FIG. 2A may be the controller 170 in FIG. 1. In some embodiments, the controller 170a includes the differentiator circuit 160, a gain buffer 173a, a subtractor circuit 171a, a control module 172a, an adder circuit 174a and a pulse frequency modulation circuit 175a. The differentiator circuit 160 is configured to detect the rate of change Io_rate of the output current Io, and provide the rate of change Io_rate of the output current Io to the gain buffer 173a.

In some embodiments, the controller 170a is further configured to determine whether the rate of change Io_rate of the output current Io is greater than the rate threshold value IDIFF_NO_FF and whether the switching frequency of the plurality of first switching signals 171 is greater than the frequency threshold value MIN_FSW_NO_FF. When the controller 170a determines that the rate of change Io_rate of the output current Io is greater than the rate threshold value IDIFF_NO_FF and the switching frequency of the plurality of first switching signals 171 is greater than the frequency threshold value MIN_FSW_NO_FF, the controller 170a triggers the gain buffer 173a to generate the first regulating parameter f_FF according to the rate of change Io_rate of the output current Io. When the controller 170a determines that the rate of change Io_rate of the output current Io is not greater than the rate threshold value IDIFF_NO_FF or the switching frequency of the plurality of first switching signals 171 is not greater than the frequency threshold value MIN_FSW_NO_FF, the controller 170a does not trigger the gain buffer 173a. Since the gain buffer 173a is only triggered under special conditions, an interference of the gain buffer 173a to an operation of the control module 172a under a normal regulation and small load change is prevented. In addition, when a relatively large load change is detected while the controller 170a is operated under relatively high frequency, the gain buffer 173a is triggered to quickly regulate the switching frequency of the plurality of first switching signals 171, thereby avoiding deep drop of the output voltage Vo due to a large load change.

The rate threshold value IDIFF_NO_FF may be selected to be lower than a difference of the output current Io between the current sampling period and the previous sampling period at the minimum output current slew rate in a slew rate range. In an example, when the slew rate range of the output current Io is between 0.1 A/us and 1 A/us, the minimum output current slew rate is 0.1 A/us. The frequency threshold value MIN_FSW_NO_FF may be selected to be higher than a switching frequency of the controller 170a at the rate threshold value IDIFF_NO_FF.

The gain buffer 173a is configured to generate a first regulating parameter f_FF according to the rate of change Io_rate of the output current Io. In some embodiments, for each sampling period Ts, the gain buffer 173a is configured to multiply the rate of change Io_rate of the output current Io with a first gain KFF to generate the first regulating parameter f_FF. The first regulating parameter f_FF may indicate a frequency change corresponding to the rate of change Io_rate of the output current Io.

In some embodiments, the first gain KFF is selected such that it brings the switching frequency of the plurality of first switching signals 171 from a frequency FSW_NO_LOAD to the frequency threshold value MIN_FSW_NO_FF in a number of sampling periods Tcycle,srx corresponding to a slew rate srx. In some embodiments, the power supply apparatus 200 operates at the frequency FSW_NO_LOAD in a first load condition, and power supply apparatus 200 operates at the frequency threshold value MIN_FSW_NO_FF at a second load condition. For example, the first load condition may be a no-load condition or a light load condition (i.e., 0% load or near 0% load), and the second load condition may be a 50% load condition or a 100% load condition. The power supply apparatus 200 may operate in a burst mode when the load condition is the no-load condition (i.e., 0% load). In some embodiments, the number of sampling periods Tcycle, srx it takes to change from the first load condition to the second load condition, and the rate of change of the output current Io_rate,srx may be computed for each of the slew rates srx, based on the range of slew rates and the sampling period Ts of the controller 170a.

In some embodiments, the first gain KFF may be KFF,srx of equation (2) below. The controller 170a is configured to calculate a gain KFF,srx for each of the slew rate srx according to equation (2), in which Io_rate,srx is the rate of change of the output current for the slew rate srx, and Tcycle,srx is the number of sampling periods it takes to change from the first load condition to the second load condition, FSW_NO_LOAD is the switching frequency of the controller 170a at the first load condition, and MIN_FSW_NO_FF (also referred to as the frequency threshold value) is the switching frequency of the controller 170a at the second load condition.

$$KFF, srx = \frac{FSW\_NO\_LOAD - MIN\_FSW\_NO\_FF}{T\text{cycle}, srx * Io_{rate}, srx} \quad (2)$$

In some embodiments, the first gain KFF is an average of the gains KFF,srx corresponding to all slew rates in the slew rate range. In some embodiments, the first gain KFF is the gain KFF,srx that is selected based on the rate of change Io_rate of the output current Io. The first gain KFF may be selected from a look-up table using the rate of change Io_rate of the output current Io. The gain buffer 173a may output the first regulating parameter f_FF to the adder circuit 174a.

In some embodiments, the subtractor circuit 171a is configured to calculate a voltage difference Vdif between the target voltage Vtar and the output voltage Vo of the power supply apparatus 200. The subtractor circuit 171a may subtract the output voltage Vo from the target voltage Vtar to generate the voltage difference Vdif. The subtractor circuit 171 may provide the voltage difference Vdif to the control module 172a.

In some embodiments, the control module 172a is coupled to the subtractor circuit 171a. The control module 172a is configured to generate a second regulating parameter f_cntl according to the voltage difference Vdif between the target voltage Vtar and the output voltage Vo. The control module 172a outputs the second regulating parameter f_cntl to the adder circuit 174a.

In some embodiments, the adder circuit 174a is coupled to the gain buffer 173a and the control module 172a. The adder circuit 174a is configured to add the first regulating parameter f_FF to the second regulating parameter f_cntl to generate the third regulating parameter f_reg. The adder circuit 174a outputs the third regulating parameter f_reg to the pulse frequency modulation circuit 175a. The pulse frequency modulation circuit 175a is configured to generate the plurality of first switching signals 171 according to the third regulating parameter f_reg.

In some embodiments, when the controller 170a determines that the rate of change Io_rate of the output current Io is not greater than the rate threshold value IDIFF_NO_FF or the switching frequency of the plurality of first switching signals 171 is not greater than the frequency threshold value MIN_FSW_NO_FF, the controller 170a does not trigger the gain buffer 173a. When the controller 170a does not trigger the gain buffer 173a, the third regulating parameter f_reg is the same as the second regulating parameter f_cntl.

In this way, the controller 170a may regulate the switching frequency of the plurality of first switching signals 171 according to the rate of change Io_rate of the output current Io.

FIG. 2B illustrates a schematic diagram of a controller 170b of a power supply apparatus in accordance with some embodiments. Referring to FIG. 1 and FIG. 2B, the controller 170b may be the controller 170 in FIG. 1. In some embodiments, the controller 170b includes the differentiator circuit 160, a gain buffer 173b, a subtractor circuit 171b, a control module 172b, an adder circuit 174b and a pulse frequency modulation circuit 175b. The differentiator circuit 160 is configured to detect the rate of change Io_rate of the output current Io, and provide the rate of change Io_rate of the output current Io to the gain buffer 173b.

In some embodiments, the controller 170b is configured to determine whether the rate of change Io_rate of the output current Io is greater than the rate threshold value IDIFF_NO_FF and whether the switching frequency of the plurality of first switching signals 171 is greater than the frequency threshold value MIN_FSW_NO_FF. When the controller 170b determines that the rate of change Io_rate of the output current Io is greater than the rate threshold value IDIFF_NO_FF and the switching frequency of the plurality of first switching signals 171 is greater than the frequency threshold value MIN_FSW_NO_FF, the controller 170b triggers the gain buffer 173b to generate a first regulating parameter Tc_FF according to the rate of change Io_rate of the output current Io.

In some embodiments, the frequency threshold value MIN_FSW_NO_FF may be represented in digital implementation as a period threshold value MIN_PER_NO_FF or a count threshold value Tc_PER_NO_FF of a clock period Tclk. The period threshold value MIN_PER_NO_FF is calculated according to equation (3). A relation between the Tc_PER_NO_FF, the clock period Tclk and the frequency threshold value MIN_FSW_NO_FF is represented in equation (4).

$$\text{MIN\_PER\_NO\_FF} = 1/\text{MIN\_FSW\_NO\_FF} \tag{3}$$

$$\text{Tc\_PER\_NO\_FF} * \text{Tclk} = 1/\text{MIN\_FSW\_NO\_FF} \tag{4}$$

In some embodiments, the controller 170b is configured to determine whether the rate of change Io_rate of the output current Io is greater than the rate threshold value IDIFF_NO_FF and whether a switching period of the plurality of first switching signals 171 is less than the period threshold value MIN_PER_NO_FF to trigger the gain buffer 173b. When the controller 170b determines that the rate of change Io_rate of the output current Io is greater than the rate threshold value IDIFF_NO_FF and the switching period of the plurality of first switching signals 171 is less than the period threshold value MIN_PER_NO_FF, the controller 170b triggers the gain buffer 173b to generate the first regulating parameter Tc_FF according to the rate of change Io_rate of the output current Io. Otherwise, when the controller 170b determines that the rate of change Io_rate of the output current Io is not greater than the rate threshold value IDIFF_NO_FF or the switching period of the plurality of first switching signals 171 is not less than the period threshold value MIN_PER_NO_FF, the controller 170b does not trigger the gain buffer 173b. Since the gain buffer 173b is only triggered under special conditions, an interference of the gain buffer 173b to an operation of the control module 172b under a normal regulation and small load change is prevented. In addition, when a relatively large load change is detected while the switching period of the plurality of first switching signals 171 is relatively short, the gain buffer 173b is triggered to quickly regulate the switching period of the plurality of first switching signals 171, thereby avoiding deep drop of the output voltage Vo due to the large load change.

The determination of the rate threshold value IDIFF_NO_FF is described in association with FIG. 2A. Thus, the detailed description about the determination of the rate threshold value IDIFF_NO_FF is omitted hereafter. In addition, the period threshold value MIN_PER_NO_FF and the count threshold value Tc_PER_NO_FF may be determined according to the frequency threshold value MIN_FSW_NO_FF based on equations (3) and (4).

In some embodiments, for each sampling period Ts, the gain buffer 173b is configured to multiply the rate of change Io_rate of the output current Io with a first gain KFF to generate the first regulating parameter Tc_FF. The first regulating parameter Tc_FF may indicate a period change (i.e., a count of a number of the clock periods Tclk) corresponding to the rate of change Io_rate of the output current Io.

In some embodiments, the first gain KFF may be KFF,srx of equation (5) below. The first gain KFF is determined according to a gain KFF,srx corresponding to each slew rate srx in the slew rate range. The gain KFF,srx corresponding to each slew rate is calculated according to equation (5), in which Io_rate,srx is the rate of change of the output current for the slew rate srx, Tcycle,srx is the number of sampling periods it takes to change from the first load condition to the second load condition, Tc_PER_NO_LOAD is the count of clock periods of the controller 170b at the first load condition, and Tc_PER_NO_FF (also referred to as the count threshold value) is the count of the clock periods of the controller 170b at the second load condition.

$$KFF, srx = \frac{\text{Tc\_PER\_NO\_FF} - \text{Tc\_PER\_NO\_LOAD}}{T\text{cycle}, srx \cdot Io_{rate}, srx} \tag{5}$$

In some embodiments, the first load condition may be a no-load condition (i.e., 0% load), and the second load condition may be a 50% load condition or a 100% load condition.

In some embodiments, the first gain KFF is an average of the gains KFF,srx corresponding to all slew rates in the slew rate range. In some alternative embodiments, the first gain KFF is the gain KFF,srx that is selected based on the rate of change Io_rate of the output current Io. The first gain KFF may be selected from a look-up table using the rate of change Io_rate of the output current Io. The gain buffer 173b may output the first regulating parameter Tc_FF to the adder circuit 174b.

In some embodiments, the subtractor circuit 171b of the controller 170b is similar to the subtractor circuit 171a of the controller 170a in FIG. 3A. Thus, the description of the subtractor circuit 171b is omitted hereafter. The control module 172b is coupled to the subtractor circuit 171b. The control module 172b is configured to generate a second regulating parameter Tc_cntl according to the voltage difference Vdif between the target voltage Vtar and the output voltage Vo. The control module 172b outputs the second regulating parameter Tc_cntl to the adder circuit 174b.

In some embodiments, the adder circuit 174b is coupled to the gain buffer 173b and the control module 172b. The adder circuit 174b is configured to add the first regulating parameter Tc_FF to the second regulating parameter Tc_cntl to generate the third regulating parameter Tc. The adder circuit 174b outputs the third regulating parameter Tc to the pulse frequency modulation circuit 175b. The pulse frequency modulation circuit 175b is configured to generate the plurality of first switching signals 171 according to the third regulating parameter Tc.

In some embodiments, when the controller 170b determines that the rate of change Io_rate of the output current Io is not greater than the rate threshold value IDIFF_NO_FF or the switching period of the plurality of first switching signals 171 is not less than the frequency threshold value MIN_PER_NO_FF, the controller 170b does not trigger the gain buffer 173b. When the controller 170b does not trigger the gain buffer 173b, the third regulating parameter Tc is the same as the second regulating parameter Tc_cntl.

In this way, the controller 170b may regulate the switching period of the plurality of first switching signals 171 according to the rate of change Io_rate of the output current Io.

Figure 3:
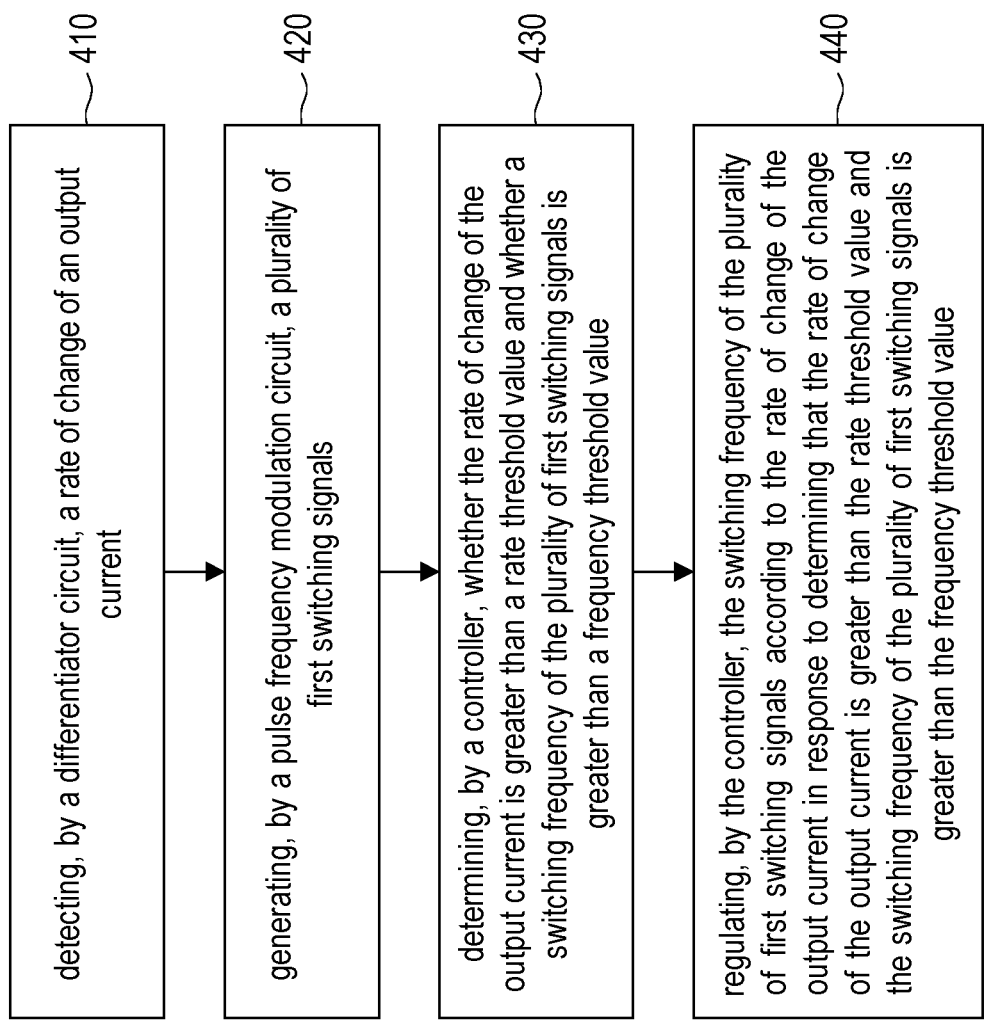
FIG. 3 is a flowchart diagram illustrating an operation method of a power supply apparatus in accordance with some embodiments.

FIG. 3 is a flowchart diagram illustrating an operation method of a power supply apparatus in accordance with some embodiments. Referring to FIG. 1 and FIG. 3, the power supply apparatus 100 may include a transformer 130, a plurality of switches Q1, Q2, Q3 and Q4, a rectifier circuit 140, a current sensing circuit 150, and a controller 170. The transformer 130 includes a first side and a second side. The plurality of switches Q1, Q2, Q3 and Q4 is coupled to the first side of the transformer 130. The rectifier circuit 140 is coupled to the second side of the transformer 130 and outputs an output current Io. The current sensing circuit 150 is coupled to the rectifier circuit 140 and senses the output current Io. The controller 170 includes a differentiator circuit 160 and a pulse frequency modulation circuit.

In step S410, a rate of change of the output current is detected by the differentiator circuit. In step 420, a plurality of first switching signals is generated by a pulse frequency modulation circuit. In step 430, the controller determines whether the rate of change of the output current is greater than a rate threshold value and whether a switching frequency of the plurality of first switching signals is greater than a frequency threshold value. In step 440, the switching frequency of the plurality of first switching signals is regulated by the controller according to the rate of change of the output current in response to determining that the rate of change of the output current is greater than the rate threshold value and the switching frequency of the plurality of first switching signals is greater than the frequency threshold value.

In some embodiments of the disclosure, a power supply apparatus includes a differentiator circuit that detects a rate of change of an output current in each sampling period. Thus, the load change or load jump can be detected quickly. For example, the load jump from a no-load or light load condition (i.e., a 0% load) to a heavy load condition (i.e., 50% load or 100% load) can be detected quickly by the differentiator circuit. The differentiator circuit may output a larger rate of change of the output current in response to a larger slew rate of the output current or a large load jump. A gain buffer multiplies the rate of change of the output current by a first gain to generate a first regulating parameter which represents a frequency change or a period change of the plurality of first switching signals. The controller is configured to regulate the plurality of first switching signals based on the first regulating parameter in each sampling period. In this way, the frequency change or the period change is applied to regulate the plurality of first switching signals from the moment that the load jump is applied. Accordingly, the controller does not get saturated and can quickly regulate the plurality of first switching signals to quickly meet the load jump without causing a deep drop of an output voltage of the power supply apparatus.

In addition, the gain buffer of the controller is only triggered to generate the first regulating parameter under specific conditions. For example, the gain buffer is triggered when the rate of change of the output current is greater than a rate threshold value and when a switching frequency of the plurality of first switching signals is greater than a frequency threshold value. Alternatively, the gain buffer is triggered when the rate of change of the output current is greater than the rate threshold value and the switching period of the plurality of first switching signals is less than the period threshold value. In other words, the gain buffer is only triggered under a relatively large load jump (i.e., from a no-load condition or a very load to 50% load condition or to 100% load condition) and relatively high switching frequency of the plurality of first switching signals. In this way, an interference of the differentiator circuit to a normal operation of the controller under constant load regulation and small load jumps is prevented. Furthermore, in some embodiments, the differentiator circuit and the gain buffer may be implemented as firmware modules of a controller, or in an integrated circuit, without increasing manufacturing cost of the power supply apparatus.

Although the embodiments of the disclosure have been described in detail, the disclosure is not limited to a specific embodiment and various modifications and changes are possible within the scope of the disclosure disclosed in the claims.

What is claimed is:

1. A power supply apparatus, comprising:
   a transformer, comprising a first side and a second side;
   a plurality of switches coupled to the first side of the transformer;
   a rectifier circuit coupled to the second side of the transformer, outputting an output current;
   a current sensing circuit coupled to the rectifier circuit, sensing the output current; and
   a controller coupled to the current sensing circuit, comprising:
      a differentiator circuit, coupled to the current sensing circuit, configured to detect a rate of change of the output current; and
      a pulse frequency modulation circuit coupled to the differentiator circuit, configured to generate a plurality of first switching signals,
   wherein the controller is configured to regulate a switching frequency of the plurality of first switching signals according to the rate of change of the output current in response to determining that the rate of change of the output current is greater than a rate threshold value and the switching frequency of the plurality of first switching signals is greater than a frequency threshold value.

2. The power supply apparatus according to claim 1, further comprising a resonant circuit coupled to the plurality of switches and the first side of the transformer, the resonant circuit comprising a capacitor and an inductor.

3. The power supply apparatus according to claim 1, wherein the controller further comprises a gain buffer,
   wherein when the controller determines that the rate of change of the output current is greater than the rate threshold value and the switching frequency of the plurality of first switching signals is greater than the frequency threshold value, the controller is further configured to trigger the gain buffer to generate a first regulating parameter according to the rate of change of the output current.

4. The power supply apparatus according to claim 3, wherein
   the differentiator circuit is further configured to detect the rate of change of the output current in each sampling period of the power supply apparatus, and
   the differentiator circuit is further configured to detect the rate of change of the output current according to a differentiator gain and a difference between a first output current in a first sampling period and a second output current in a second sampling period, wherein the first sampling period and the second sampling period are consecutive sampling periods.

5. The power supply apparatus according to claim 4, wherein
   the differentiator gain is determined according to a bit width of a register in the controller.

6. The power supply apparatus according to claim 3, wherein the controller further comprises:
   a subtractor circuit, configured to calculate a voltage difference between a target voltage and an output voltage of the power supply apparatus;
   a control module, coupled to the subtractor circuit, configured to generate a second regulating parameter according to the voltage difference between the target voltage and the output voltage;

an adder circuit, coupled to the gain buffer and the control module, configured to add the first regulating parameter to the second regulating parameter to generate the third regulating parameter, wherein the pulse frequency modulation circuit is configured to generate the plurality of first switching signals according to the third regulating parameter.

7. The power supply apparatus according to claim 6, wherein the power supply apparatus further comprises:

an isolator circuit, coupled to the pulse frequency modulation circuit; and a gate driver circuit, coupled to the isolator circuit, wherein the isolator circuit receives the plurality of first switching signals and outputs a plurality of second switching signals to the gate driver circuit, wherein the gate driver circuit receives the plurality of second switching signals and outputs a plurality of driving signals to the plurality of switches.

8. The power supply apparatus according to claim 6, wherein
the first regulating parameter is a frequency change.

9. The power supply apparatus according to claim 6, wherein
the first regulating parameter is a first count value which indicates a first number of clock cycles of the pulse frequency modulation circuit,
the second regulating parameter is a second count value which indicates a second number of clock cycles of the pulse frequency modulation circuit.

10. The power supply apparatus according to claim 3, wherein the gain buffer is configured to multiply the rate of change of the output current with a first gain to generate the first regulating parameter.

11. The power supply apparatus according to claim 1, wherein the rate threshold value is less than a difference between a first output current in a first sampling period and a second output current in a second sampling period at a minimum output current slew rate of the power supply apparatus.

12. An operation method of a power supply apparatus, wherein the power supply apparatus comprises a transformer, a plurality of switches, a rectifier circuit, a current sensing circuit, and a controller, the transformer comprises a first side and a second side, the plurality of switches is coupled to the first side of the transformer, the rectifier circuit is coupled to the second side of the transformer and outputs an output current, the current sensing circuit is coupled to the rectifier circuit and senses the output current, the controller includes a differentiator circuit and a pulse frequency modulation circuit, the differentiator circuit is coupled to the current sensing circuit, the operation method comprising:

detecting, by the differentiator circuit, a rate of change of the output current;

generating, by the pulse frequency modulation circuit, a plurality of first switching signals;

determining, by the controller, whether the rate of change of the output current is greater than a rate threshold value and whether a switching frequency of a plurality of first switching signals is greater than a frequency threshold value; and regulating, by the controller, the switching frequency of the plurality of first switching signals according to the rate of change of the output current in response to determining that the rate of change of the output current is greater than the rate threshold value and the switching frequency of the plurality of first switching signals is greater than the frequency threshold value.

13. The operation method of claim 12, wherein
the rate of change of the output current is detected in each sampling period of the power supply apparatus, and
the rate of change of the output current is detected according to a differentiator gain and a difference between a first output current in a first sampling period and a second output current in a second sampling period, wherein the first sampling period and the second sampling period are consecutive sampling periods.

14. The operation method of claim 12, wherein
wherein the rate threshold value is less than a difference between a first output current in a first sampling period and a second output current in a second sampling period at a minimum output current slew rate of the power supply apparatus.

15. The operation method of claim 12, further comprising:
calculating a voltage difference between a target voltage and an output voltage of the power supply apparatus;
generating a first regulating parameter according to the rate of change of the output current in response to determining that the rate of change of the output current is greater than the rate threshold value and the switching frequency of the plurality of first switching signals is greater than the frequency threshold value;
generating a second regulating parameter according to the voltage difference between the target voltage and the output voltage;
generating a third regulating parameter by adding the first regulating parameter to the second regulating parameter; and
generating, by the pulse frequency modulation circuit, the plurality of first switching signals according to the third regulating parameter.

16. The operation method of claim 15, wherein the first regulating parameter is a frequency change.

17. The operation method of claim 15, wherein the first regulating parameter is a first count value which indicates a first number of clock cycles of the pulse frequency modulation circuit,
wherein the second regulating parameter is a second count value which indicates a second number of clock cycles of the pulse frequency modulation circuit.

18. The operation method of claim 15, wherein generating the first regulating parameter according to the rate of change of the output current comprises:
multiplying the rate of change of the output current with a first gain to generate the first regulating parameter.

* * * * *